United States Patent [19]

Ranner

[11] 3,892,923

[45] July 1, 1975

[54] SUPERVISION ARRANGEMENT FOR A PULSE CODE-MODULATION SYSTEM

[75] Inventor: Georg Ranner, Lauf, Germany

[73] Assignee: U.S. Philips Corporation, New York, N.Y.

[22] Filed: Aug. 6, 1973

[21] Appl. No.: 385,674

[30] Foreign Application Priority Data

Aug. 16, 1972 Germany ........................... 2240218

[52] U.S. Cl. ............................................ 179/15 BF

[51] Int. Cl. ............................................ H04j 3/00

[58] Field of Search ............. 179/15 BF; 325/41, 42

[56] References Cited

UNITED STATES PATENTS 3,743,938 7/1973 Davis ............................. 179/15 BF 3,787,628 1/1974 Van Dijk ......................... 179/15 BF

*Primary Examiner*—Ralph D. Blakeslee

*Attorney, Agent, or Firm*—Frank R. Trifari

[57] ABSTRACT

A system using a test pulse pattern corresponding to a PCM word. The test pulse pattern is stored and also applied to the input of a decoder of a terminal station. The analog output of the decoder is applied to the encoder of the same terminal station. The pulse pattern output of the encoder is compared with a stored test pulse pattern. A comparator gives an alarm when the test pulse pattern and a second pulse pattern are not equal.

9 Claims, 3 Drawing Figures

SUPERVISION ARRANGEMENT FOR A PULSE CODE-MODULATION SYSTEM

Figure 1:
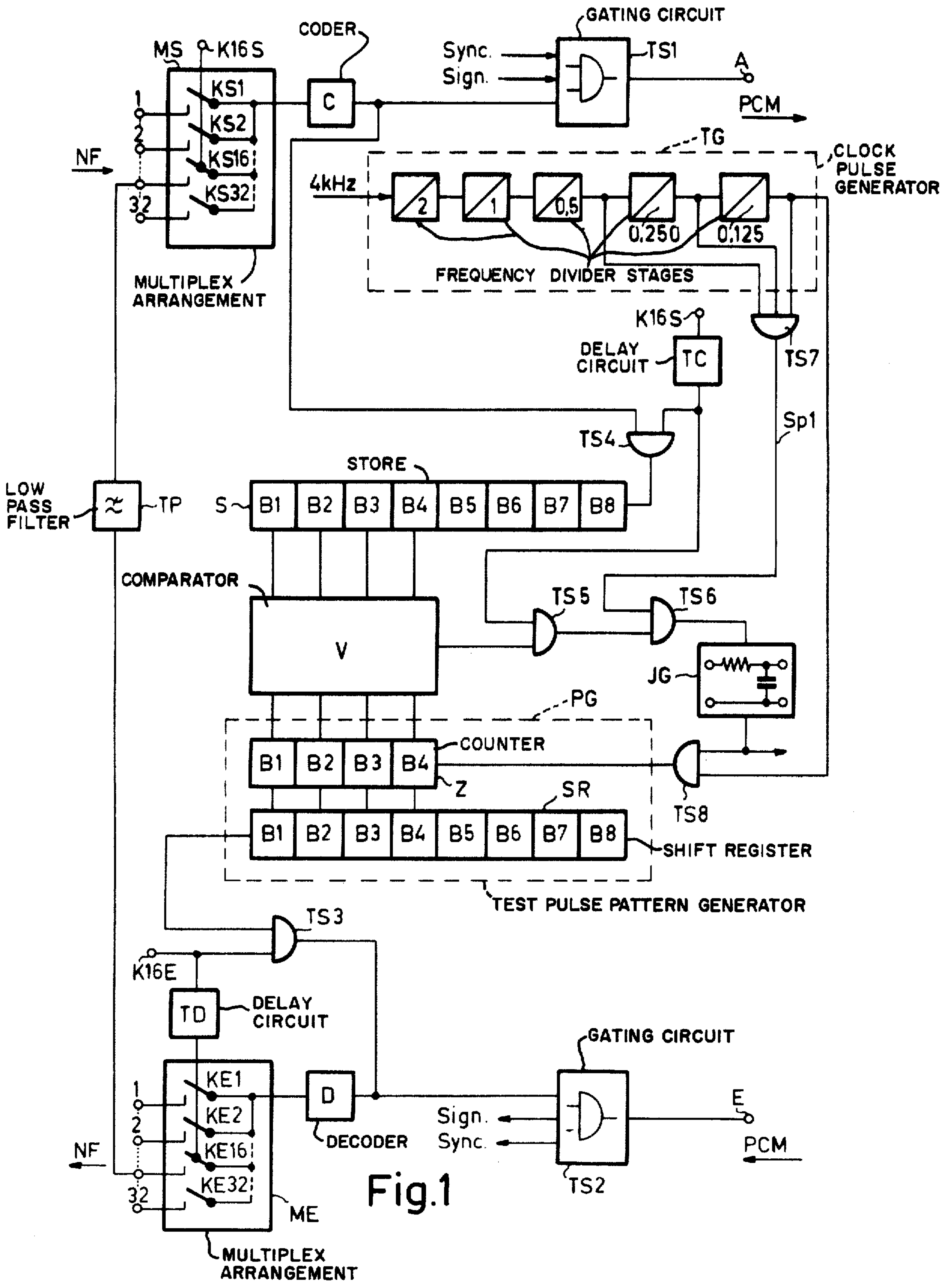

The invention relates to an arrangement for supervising the coder on the send side and the decoder on the receive side in a terminal station of a system for the transmission of analog signals by pulse code modulation. Such transmission systems are used when different information channels are to be transmitted in a prescript limited transmission band and are based on the fact that it is sufficient for the transmission of an analog signal to transmit discrete amplitude values of this analog signal obtained by sampling, provided that the sampling frequency is at least twice the highest frequency of the analog signal.

The received discrete amplitude values are applied to a filter from whose output the analog signal can be derived.

A terminal station of such a transmission system consists typically of a transmitter and a receiver, the transmitter including a multiplex arrangement whose inputs are connected to the information channels to be transmitted and a coder whose input is connected to the output of the multiplex arrangement, and the receiver including a decoder to whose input the received pulsatory signal is applied and whose output is connected to a demultiplex arrangement from whose outputs the signals associated with the different information channels can be derived. The analog signals transmitted through the incoming information channels are cyclically sampled by means of the multiplex arrangement, the sampling time interval being equal for each channel. The amplitude samples obtained are applied to the coder by means of which each amplitude sample is quantized and is converted into a code word having a given number of bits, the instants when the bits of a code word occur coincide with a series of equidistant pulses. The bits of the code words thus formed occur at the output of the terminal station and are subsequently transmitted to the terminal station on the other end of the transmission path.

The pulse sequence transmitted from the terminal station on the other end of the transmission path is applied to the receiver and there the pulses of a code word are converted into the corresponding amplitude sample by means of a decoder. The amplitude samples formed in this manner are applied to the demultiplex arrangement by means of which they are distributed over the information channels connected thereto. In the transmitter at the output of the coder to the sequence of the pulses representing the amplitude samples of the analog signals further pulses serving for synchronising and signalling purposes are added. This may be effected in adding an extra bit for synchronizing and signalling purposes to each code word. Alternatively a sampling cycle may comprise one or more additional time slots, one time slot as long as an information code word and the extra bits for synchronizing and signalling purposes being combined to pulse groups of the length of a code word and being transmitted between the information code words on the place of an additional time slop referred to before. In an established PCM-transmission system using 30 information channels the pulse groups for signalling and synchronisation are transmitted in the time slot 16 and in the time slot 32 so that the system operates with a total of 32 channels.

The amplitude samples are quantized for the purpose of coding and to this end the entire amplitude range to be transmitted is subdivided in intervals, each interval being associated with a given code word having a given pulse combination. The number of intervals is dependent on the requirements which are imposed on the transmission quality; the stricter these requirements, the higher the number of intervals and the number of bits per code word for a corresponding smaller interval width and the lower the quantisation noise occurring at the output of the decoder. Starting from the fact that, for example, in transmitting speech signals a greater dynamic range is to be processed, the individual amplitude intervals may be chosen different, which makes a constant relative quantisation noise over a comparatively large range possible.

In the known transmission system comprising thirty information channels one amplitude sample is allocated an eight-bit code word, one bit of which serving for the indication of the polarity and the other seven bits serving for quantisation of the signal amplitude. Thus $2^7$, i.e. 128 levels are available, which is equivalent to 127 level distances. The levels are divided in eight linear regions, each region covering 16 levels. In the first two regions the level distances are equally large and are equal to a quantisation unit and in the subsequent regions the distances become a factor of two larger so that the largest distance comprises 64 quantisation units.

Following this quantisation method three bits of a code word indicate the linear region and four bits effect a more accurate division of each region and characterize the position of an amplitude sample within a region. The signal value in case of highest amplitude then is $32 \times 1 + 16 \times 2 + 16 \times 4 + 16 \times 8$ etc . . . . . $16 \times 64 =$ 2048 times the quantisation unit. Thus, this unit is 2048 / 128, i.e. 16 times as small as that which would be used in case of a linear quantisation with the same number of levels.

The pulses for signalling and synchronisation are introduced into the flow of information behind the coder on the send side and they are removed from this flow again before the decoder on the receive side so that these pulses cannot supervise these two arrangements. The coder and decoder are, however, central arrangements so that a defect will lead to a total failure of the system when, for example, by interference in the coder or in the decoder the quantisation noise exceeds the admissible level making the transmission of information completely impossible. It is an object of the present invention to provide an arrangement for supervising the coder on the send side and the decoder on the receive side in a terminal station, enabling a supervision without detrimentally influencing the transmission of information working in an information transmission system using n channels in which m channels are provided for the transmission of analog information signals and $n$-$m$ channels are provided for the transmission of signalling and synchronisation information, the channels transmitting the analog information signals being cyclically sampled and quantized in accordance with a piecewise linear coding characteristic. The circuit arrangement is to be realized at the lowest cost possible and should not cooperate with arrangements in the terminal station provided at the other end of the transmission path and therefore it should work particularly without a pilot signal to be transmitted through the transmission path so that defects in the transmission path or in the other terminal station cannot simulate a defect in the terminal station to be supervised. In case of the occurrence of interference the supervision arrangement is to give an alarm signal.

According to the invention this object is achieved with an arrangement comprising a test pulse pattern generator whose output is connected to the input of the decoder on the receive side during at least one of the *n-m* channels for the transmission of signalling and synchronizing information and which generates a test pulse pattern corresponding to a PCM channel code word which is applied to the decoder on the receive side for the purpose of conversion into the corresponding analog value, the output of the decoder on the receive side and the input of the coder on the send side being connected during said period to a connection line passing the analog value corresponding to the decoded test pulse pattern, said analog value being applied through said connection line to the coder on the send side in which the said analog value is converted into a second pulse pattern by means of coding, the arrangement furthermore comprising a store in which said second pulse pattern is stored, the output of said store as well as the output of the test pulse pattern generator being connected to the inputs of a comparator to which the test pulse pattern and the second pulse pattern are applied and which gives an alarm signal when the two pulse patterns are not equal.

Figure 2:
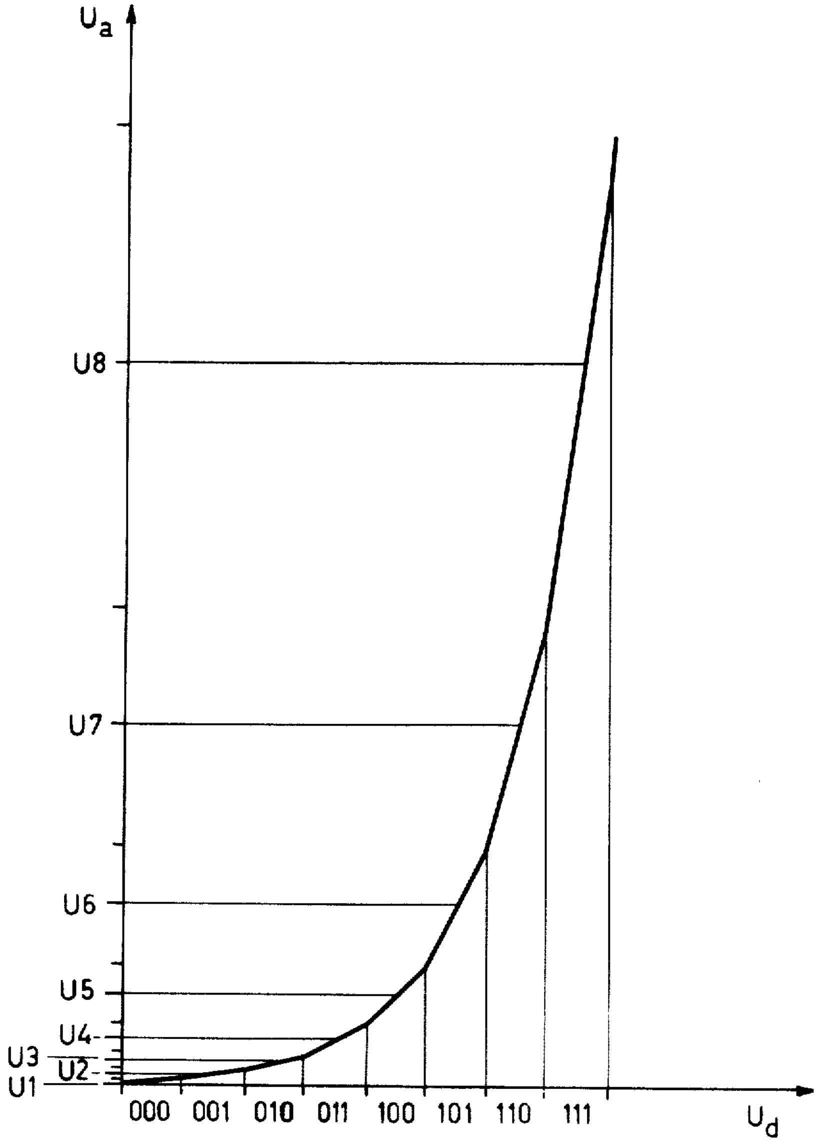
Figure 3:
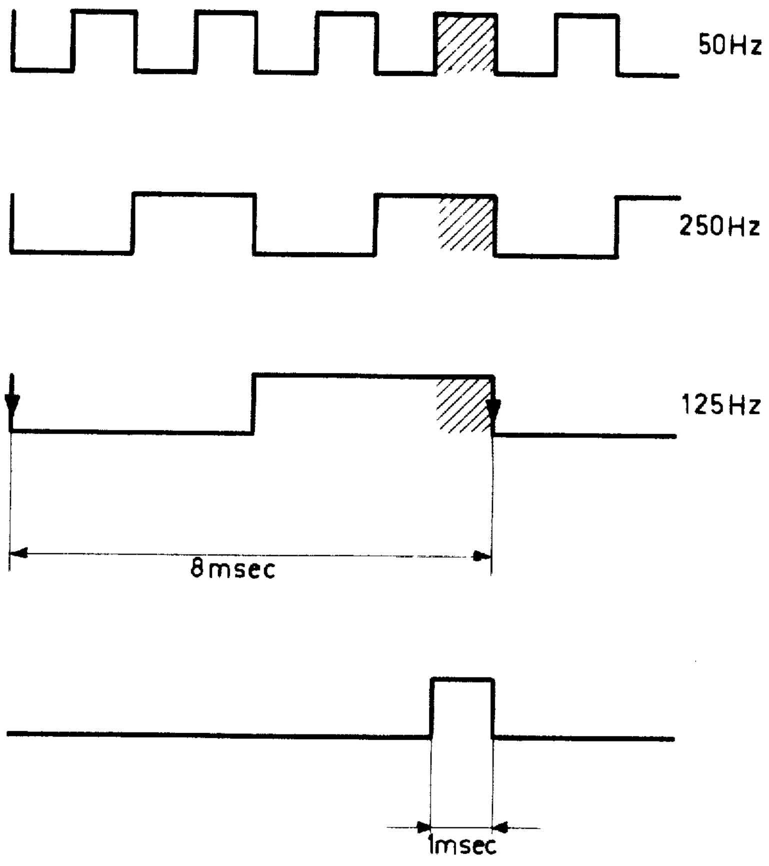

The invention and its advantages will be described more in particular with reference to the accompanying drawings, in which FIG. 1 shows a non-detailed block schematic diagram of a terminal station of a PCM time division multiplex system including an embodiment of a supervision arrangement according to the invention and FIG. 2 shows the piecewise linear coding characteristic used for quantisation and FIG. 3 shows a pulse diagram.

The starting point is a PCM time division multiplex system for the transmission of 30 information channels with two additional channels for signalling and synchronising information being added between the information channels so that a total of 32 channels is transmitted between the terminal stations of this PCM-time division multiplex system and a transmission interval is divided in 32 channel time slots. The signalling and synchronizing information is transmitted in the sixteenth and in the thirty-second channel. In FIG. 1 the low-frequency information signals to be transmitted from the 30 channels are applied to the multiplex arrangement MS on the send side and then each is sampled by means of channel gates KS1 . . . KS32. The samples are applied to the coder C on the send side and are quantized in accordance with the piecewise linear coding characteristic shown in FIG. 2 and converted into code words each consisting of eight bits. The piecewise linear coding characteristic is subdivided in 13 segments each having a different slope, seven segments of which are completely shown in FIG. 2 while the other segments continue reflected in the third quadrant not shown. The first bit of the code word consisting of eight bits indicates the polarity of an amplitude sample, the three subsequent bits characterize the segments in whose amplitude range the value of the amplitude sample is located and the last four bits indicate the position of this value in the segment. For this purpose each segment is subdivided in 16 regions which are equally large relative to one another so that for low amplitude values the subdivision is finer than for large amplitude values.

The code words generated in the coder C on the send side arrive at the gating circuit TS 1 and are applied from this gating circuit through the output A of the terminal station to the transmission path. The gating circuit TS1 serves to decouple the coder C from the output A every time after 15 information channels, i.e. during the channel time slots 16 and 32 for to insert the signalling and synchronising information in the pulse train. The arrangements for controlling the channel gates in the multiplex arrangement at the send side and for controlling the gating circuit TS 1 are not shown for the sake of simplicity.

The PCM signals arriving on the transmission path from the opposite direction are applied to the input E of the terminal station and the information for signalling and synchronizing is suppressed in the gating circuit TS2 during the channel time slots 16 and 32 for which purpose the connection between the input E and the decoder D on the receive side end is interrupted. In the decoder D the code words are converted into the corresponding amplitude samples which are distributed by means of the channel gates KE 1 . . . KE32 of the multiplex arrangement ME on the receive side over the outgoing low-frequency lines. The arrangements for controlling the channel gates in the multiplex arrangement on the receive side and for controlling the gating circuit TS2 are not shown for the sake of simplicity.

The PCM signal transmitted at the output A is not necessarily synchronous with the PCM signal received at the input E and therefore the control circuits on the send side and the receive side generally do not operate in synchronism.

The arrangement for generating the test pulse pattern consists in principle of the clock pulse generator TG and the test pulse pattern generator PG. The clock pulse generator TG is a frequency divider having five divider stages; the clock frequency of 4 kHz used in the control circuit on the receive side for other purposes is applied to its input and the divider provides a pulse sequence at a frequency of 125 Hz. This pulse sequence with a frequency of 125 Hz is applied by means of the gating circuit TS8 to the counter Z in the test pulse pattern generator PG which is enabled every time by means of the trailing edge of a pulse so that its contents vary in distances of 8 milliseconds. In this embodiment of the invention the counter Z consists of four counter stages and therefore can generate only the first four bits of a code word of the test pulse pattern. The outputs of the counter stages of the counter Z are connected to the shift register SR in the test pulse pattern generator and to the comparator V. The contents of the counter Z are stored in the first four stages of the shift register SR and storing is effected with the receiver clock pulse of 2048 kHz of the multiplex arrangement ME. The arrangements required therefor are known per se and are not shown for the sake of simplicity. To complete the PCM code word consisting of eight bits the shift register SR includes four stages in which fixed values are stored. The test pulse pattern thus is an eight-bit PCM code word, the first four bits being periodically altered by the clock pulse generator TG and the other four bits having a fixed value. A given analog value is defined by these four fixed stored values which in connection with the first four bits of the code word every time determines an amplitude value in the middle of a segment.

These amplitude values are denoted by $u1, u2 \ldots u8$ in FIG. 2.

Due to the alteration of only the first four bits of the code word every time an analog value from always another segment is chosen so that in case of a defect it can be found out which segment is erroneously coded or decoded.

The output of the shift register SR in the test pulse pattern generator PG is connected by means of the gating circuit TS3 to the input of the decoder D on the receive side. This gating circuit is enabled by the control pulse K 16E for the channel gate KE 16 and the decoder D converts the code word of the test pulse pattern into the corresponding analog value. The channel gate KE16 is enabled by the control pulse K16 after a delay time equal to the time needed for decoding and the analog value is obtained through a connection line at the channel gate KS16 in the multiplex arrangement MS on the send side. The delay is realized with the delay circuit TD.

The connection line includes a lowpass filter TP. For the level adaptation between the receiver and the transmitter a level adaptor may be additionally provided. The time constant of the lowpass filter TP is shorter than the reciprocal frequency of the clock pulse generator used to control the test pulse pattern generator. Upon the first occurrence of an amplitude value this value, due to this time constant, is not immediately passed on with its complete amplitude to the multiplex arrangement MS on the send side. The amplitude value is stored for a given period so that the clock time differences between the control circuits on the send side and on the receive side, i.e. between the transmission clock and the send side and the receiver clock on the receive side are compensated. Other circuit arrangements described hereinafter prevent an alarm signal being given when in case of the first occurrence of an amplitude value after a new adjustment of the counter Z the entire amplitude value is not immediately present at the input of the coder C on the send side.

The channel gate KS16 in the multiplex system on the send side is enabled by means of the control pulse K16S and simultaneously, as described before, the gating circuit TS1 has decoupled the output A of the terminal station from the output of the coder C so that the code word formed from the analog value taken over through the channel gate KS16 cannot arrive at the output A of the terminal station. In case of proper operation of the decoder on the receive side and of the coder on the send side after a given time determined by the time constant of the lowpass filter TP this code word corresponds to the code word of the test pulse pattern generated by the test pulse pattern generator PG, the first four bits of which has been applied to the comparator too. This code word is applied by means of the gating circuit TS4 to the store S and is there stored to with the transmission clock of 2048 kHz of the multiples arrangement MS. The clock circuit necessary therefor is likewise not shown in FIG. 1 for the sake of simplicity. The first four bits of the code words of the test pulse pattern are stored in the first four stages B1 to B4 of this store S; the outputs of these store stages are connected to the comparator V. The gating circuit TS4 is only enabled with the control pulse KS16 delayed by the coding time so that other PCM values of the information channels cannot influence the supervision. The delay time is determined with the aid of the delay circuit TC.

The contents of the first four stages of the store S are compared with the contents of the counter Z by means of the comparator V. There must be conformity as long as the decoder on the receive side and the coder on the send side operate properly. When interference in one of these two arrangements occurs the contents of the counter Z and of the first four stages of the store S will no longer correspond and the comparator will provide alarm pulses which are applied by means of the gating circuits TS5 and TS6 to an integrating element IG. The alarm pulses thus occurring in case of interference are integrated by means of this integrating element.

The gating circuits TS5 and TS6 are used to prevent accidental alarm. Consequently the gating circuit TS5 is cut off by the control pulse K16S delayed by the coding time so that further conveyance of an alarm signal is avoided, which signal is produced while the code word formed by the coder is written in the store through the gating circuit TS4 and thus its content is altered.

The gating circuit TS6 is enabled by a pulse Sp1 which is formed by means of the gating circuit TS7 from the pulses at the outputs of the third, fourth and fifth divider stages of the clock pulse generator TG. The associated pulse diagram is shown in FIG. 3. On the third line of this pulse diagram the clock pulse 125 Hz is shown, the trailing edges of which, denoted by an arrow, control the counter Z. The pulse occurring at the output of the gating circuit TS7 is shown on line 4 of the diagram, which pulse appears 1 millisecond before the occurrence of the trailing edge of the pulse controlling the counter Z and which takes 1 millisecond only. In this manner it is avoided that after controlling of the counter, determined by the time constant of the lowpass filter TP an erroneous value at the channel gate KS1 accidentally gives an alarm.

A further arrangement in this embodiment detects in case of an alarm at which segment of the piecewise linear coding characteristic the defect occurs. For this purpose the integrating element IG and the gating circuit TS8 are provided. When an alarm occurs, the alarm pulses are integrated and cut off the gating circuit TS8 so that no further pulses from the clock pulse generator can reach the counter Z in the test pulse pattern generator PG and from this instant only the code word characterising the erroneously coded or decoded segment is transmitted through the connection line and the lowpass filter TP from the decoder on the receive side to the coder on the send side.

The invention is not limited to the above-mentioned embodiment, but may alternatively be used with other circuit arrangements. For example, an extension of the counter Z to five or more stages makes it possible to supervise also by means of code words which comprise more or all values of the value stock. By using the invention it is ensured that the functions of a supervision device can be limited to one terminal station only and that no signal is to be transmitted to the terminal station at the other end of the transmission path so that synchronizing difficulties occurring in such a method do not occur in this case. Furthermore supervision during continuous operation of the transmission system is possible without interruption or other detrimental influence of the transmission of information because supervision is only performed during the channel time slots of the channels during which the synchronizing or signalling information is transmitted and the coder and decoder are not used anyway. Supervision may be effected during all time slots provided for the transmission of the signalling and synchronizing information as well as during only some time slots or even during one of this time slots. The supervision device according to the invention provides the further advantage that the comparison is effected digitally and that the required circuit elements, with the exception of possible capacitors in the integrating element, can be completely integrated so that this device requires only very little space and has a very low current consumption.

What is claimed is:

1. Terminal station apparatus for the transmission of information by means of pulse code modulation using *n* channels, *m* channels of which are provided for the transmission of analog information signals and (*n-m*) channels are provided for the transmission of signalling and synchronizing information, which comprises a transmitter including a multiplex apparatus having inputs connected to the information channels to be transmitted and a coder whose input is connected to the output of the multiplex arrangement; a receiver including a decoder having an input for receiving the pulse code modulation signal and having an output connected to a demultiplex apparatus having outputs from which signals associated with the different information channels can be derived; said multiplex apparatus cyclically scanning the channels for the analog information signals; said coder quantizing said analog information signals in accordance with a piecewise linear coding characteristic, said terminal station apparatus including a test pulse pattern generator having an output connected to the input of said decoder on the receive side during a period defined by at least one of the (*n-m*) channels for the transmission of signalling and synchronizing information and which generates a test pulse pattern corresponding to a PCM channel code word, said pattern being applied to said decoder for conversion into the corresponding analog value, the output of the decoder and the input of the coder being connected during said period to a connection line passing the analog value corresponding to the decoded test pulse pattern, said analog value being applied, through said connection line to the coder in which said analog value is converted into a second pulse pattern by means of coding, the apparatus further comprising means for storage of said second pulse pattern, and a comparator connected to the output of said means for storage as well as the output of said test pulse pattern generator, said comparator giving an alarm when said test pulse pattern and said second pulse pattern are not equal.

2. Apparatus as claimed in claim 1, wherein said test pulse pattern is periodically variable and said test pulse pattern generator is equipped with a counter having a number of counter stages equal to the number of pulses of a PCM channel code word and that the input of said counter is connected to the output of a clock pulse generator whose output signal enables the counter.

3. Apparatus as claimed in claim 2, wherein the number of counting stages is smaller than the number of bits of a PCM-channel code word and the less important bits of the test pulse pattern are derived from a read-only memory.

4. Apparatus as claimed in claim 2, wherein the frequency of the clock pulse generator is a fraction of the sampling frequency.

5. Apparatus as claimed in claim 4, wherein said connection line between said output of said decoder and said input of said coder includes a lowpass filter.

6. Apparatus as claimed in claim 4, wherein said connection line between the output of said decoder and the input of said coder includes a lowpass filter and a level adaptor element.

7. Apparatus as claimed in claim 6, wherein said time constant of the lowpass filter is shorter than the reciprocal frequency of the clock pulse generator for the control of the test pattern generator.

8. Apparatus as claimed in claim 7, wherein said comparator is provided with a delay circuit whose delay time is shorter than the reciprocal frequency of said clock pulse generator and longer than the time constant of said lowpass filter.

9. An arrangement as claimed in claim 8, wherein said output of said comparator is connected to the clock pulse generator and said comparator causes the clock pulse generator to stop when an alarm signal occurs.

* * * * *